US012434479B2

(12) United States Patent
Asada et al.

(10) Patent No.: US 12,434,479 B2
(45) Date of Patent: Oct. 7, 2025

(54) PRINTING APPARATUS AND PRINTING METHOD

(71) Applicant: SCREEN HOLDINGS CO., LTD., Kyoto (JP)

(72) Inventors: Kazuhiko Asada, Kyoto (JP); Yasunori Akiyoshi, Kyoto (JP)

(73) Assignee: SCREEN Holdings Co., Ltd., Kyoto (JP)

( * ) Notice: Subject to any disclaimer, the term of this patent is extended or adjusted under 35 U.S.C. 154(b) by 0 days.

(21) Appl. No.: 18/421,763

(22) Filed: Jan. 24, 2024

(65) Prior Publication Data

US 2024/0157703 A1 May 16, 2024

Related U.S. Application Data

(62) Division of application No. 17/469,088, filed on Sep. 8, 2021, now Pat. No. 11,912,037.

(30) Foreign Application Priority Data

Sep. 23, 2020 (JP) ................................ 2020-158233

(51) Int. Cl.
*B41J 2/175* (2006.01)

(52) U.S. Cl.
CPC ................................ *B41J 2/17506* (2013.01)

(58) Field of Classification Search
CPC .... B41J 2/17506; B41J 2/175; B41J 2/17566; B41J 2/18; B41J 29/38; B41J 2/19; B41J 2022/12; B41J 2/17596
See application file for complete search history.

(56) References Cited

U.S. PATENT DOCUMENTS

| | | | |
|---|---|---|---|
| 8,348,399 B2 | 1/2013 | Gengrinovich | |
| 9,272,526 B2 | 3/2016 | Ando | |
| 9,694,595 B2 | 7/2017 | Ohtsu et al. | |
| 9,827,778 B2 | 11/2017 | Ishikawa et al. | |
| 2010/0085396 A1 | 4/2010 | Yokota et al. | |
| 2014/0063088 A1 | 3/2014 | Shibata | |

(Continued)

FOREIGN PATENT DOCUMENTS

| | | |
|---|---|---|
| EP | 2 977 210 A1 | 1/2016 |
| EP | 3 369 579 A1 | 9/2018 |

(Continued)

OTHER PUBLICATIONS

Extended European Search Report issued in corresponding European Patent Application No. 21193912.9-1014, dated Oct. 13, 2022.

(Continued)

*Primary Examiner* — Jannelle M Lebron
(74) *Attorney, Agent, or Firm* — Rimon P.C.

(57) ABSTRACT

An ink is circulated in a circulation path including a supply sub-tank, a discharge head and a collection sub-tank in a head unit. If the amount of the ink in the head unit decreases, the ink stored in the buffer tank is replenished to the head unit. On the other hand, in a first non-replenishment time during which the ink is not replenished, the ink is circulated through the buffer tank, the collection sub-tank and the supply sub-tank in this order. Thus, a temperature fluctuation of the replenishment ink stored in the buffer tank is suppressed. As a result, even if the ink is replenished to the head unit from the buffer tank, physical properties, particularly a viscosity, of the ink do not largely vary.

2 Claims, 10 Drawing Sheets

(56) References Cited

U.S. PATENT DOCUMENTS

| | | | |
|---|---|---|---|
| 2014/0132653 | A1 | 5/2014 | Kamiyama |
| 2016/0001570 | A1 | 1/2016 | Okayama |
| 2018/0134033 | A1 | 5/2018 | Sawase |
| 2018/0170066 | A1 | 6/2018 | Ohtsu et al. |
| 2019/0224982 | A1 | 7/2019 | Miyazaki |
| 2020/0039228 | A1 | 2/2020 | Sarkinen et al. |
| 2020/0094572 | A1 | 3/2020 | Muto |
| 2020/0147973 | A1 | 5/2020 | Sohgawa |
| 2020/0247112 | A1 | 8/2020 | Ishikawa |
| 2020/0247665 | A1 | 8/2020 | Azami et al. |

FOREIGN PATENT DOCUMENTS

| | | | |
|---|---|---|---|
| JP | 2018-165014 | A | 10/2018 |
| JP | 2019-123207 | A | 7/2019 |
| JP | 2020-044823 | A | 3/2020 |
| JP | 2020-078872 | A | 5/2020 |
| JP | 2020-124914 | A | 8/2020 |

OTHER PUBLICATIONS

Office Action dated on Mar. 26, 2024 issued in the corresponding Japanese Patent Application No. 2020-158233, w/ English Translation.

Partial European Search Report issued in corresponding European Patent Application No. 21193912.9-1017, dated Feb. 15, 2022.

Office Action dated Jul. 1, 2025, issued in corresponding Japanese Application No. 2024-098417, 7 pages.

| MODE | Feed | Return | Duty | Supply | MainRet |
|---|---|---|---|---|---|
| 1 | Low | Low | → | On | Off |
| 2 | Low | Mid | ↑ | On | Off |
| 3 | Low | High | ↑ | Off | Off |
| 4 | Mid | Low | ↓ | On | On |
| 5 | Mid | Mid | → | Off | On |
| 6 | Mid | High | ↑ | Off | On |
| 7 | High | Low | ↓ | Off | On |
| 8 | High | Mid | ↓ | Off | On |
| 9 | High | High | Zero | Off | On |
| 10 | Ovf | | Zero | Off | Off |
| 11 | | Ovf | Zero | Off | Off |

| MODE | Feed | Return | Duty | Supply | MainRet |
|---|---|---|---|---|---|
| 1 | Low | Low | → | On | Off |
| 2 | Low | Mid | ↑ | On | Off |
| 3 | Low | High | ↑ | Off | Off |
| 4 | Mid | Low | ↓ | On | On |
| 5 | Mid | Mid | → | Off | On |
| 6 | Mid | High | ↑ | Off | On |
| 7 | High | Low | ↓ | Off | On |
| 8 | High | Mid | ↓ | Off | On |
| 9 | High | High | Zero | Off | On |
| 10 | Ovf | | Zero | Off | Off |
| 11 | | Ovf | Zero | Off | Off |

PRINTING APPARATUS AND PRINTING METHOD

CROSS REFERENCE TO RELATED APPLICATION

This application is a Divisional of U.S. patent application Ser. No. 17/469,088, filed on Sep. 8, 2021, which claims the benefit of foreign priority to Japanese Patent Application No. 2020-158233 filed on Sep. 23, 2020 including specification, drawings and claims is incorporated herein by reference in its entirety.

BACKGROUND OF THE INVENTION

1. Field of the Invention

This invention relates to a printing apparatus and a printing method for printing by discharging an ink toward a recording surface of a printing medium from a nozzle of a discharge head and particularly to a technique for suppressing physical property changes of an ink.

2. Description of the Related Art

A printing apparatus using an in-head circulation technology is described, for example, in JP 2020-44823A. This printing apparatus is provided with a supply tank (corresponding to a "supply sub-tank" of the invention) for supplying an ink to a discharge head and a collection tank (corresponding to a "collection sub-tank" of the invention) for collecting the ink from the discharge head. A negative pressure in the collection tank is set to be larger than that in the supply tank, and the ink is circulated inside a head unit due to this pressure difference. Further, the ink stored in the tank having a larger negative pressure (collection tank) is moved to the other (supply tank) by a circulation pump arranged between these tanks. Further, if the amount of the ink circulated in the head unit decreases due to ink consumption by printing, the ink is replenished to the supply tank or collection tank from a main tank (corresponding to a "buffer tank" of the invention).

Further, although not described in JP 2020-44823A, a drum tank storing a large amount of the ink is connected to the main tank. If the amount of the ink stored in the main tank decreases, the ink is replenished to the main tank from the drum tank.

SUMMARY OF THE INVENTION

In the printing apparatus described in JP 2020-44823A, the ink is replenished when a decrease in the amount of the ink is detected and the ink stationary in the main tank and a pipe flows to the head unit. Thus, physical properties of the ink may vary according to the ink replenishment and adversely affect print quality. For example, if a temperature of the ink stored in the main tank and that of the ink circulating in the head unit differ, an ink temperature in the head unit may fluctuate and become unstable due to the ink replenishment from the main tank to the head unit. As a result, there have been cases where a viscosity of the ink circulating in the head unit changes to cause a reduction in print quality.

Further, in the pipe and the drum tank for replenishing the ink from the drum tank to the main tank, the ink stands still in a non-replenishment time. Thus, pigments included in the ink are precipitated to generate an ink density distribution while standing still. This density distribution is noticeable particularly in a white ink. Accordingly, an ink density may become unstable in a white main tank due to the ink replenishment from a white drum tank storing the white ink to the white main tank. As a result, a reduction in print quality has been caused in some cases.

This invention was developed in view of the above problem and aims to provide a printing technique enabling high-quality printing by suppressing variations of ink physical properties associated with ink replenishment.

A first aspect of the invention is a printing apparatus for replenishing an ink stored in a buffer tank to a head unit including a discharge head configured to print by discharging the ink from a nozzle to a recording surface of a printing medium, the apparatus comprising: a supply pipe configured to feed the ink from the buffer tank to the head unit; a collection pipe configured to return the ink from the head unit to the buffer tank; and an ink circulation driver, wherein: the head unit includes a supply sub-tank and a collection sub-tank in which the ink are stored and a connection pipe connecting the supply sub-tank and the collection sub-tank and circulates the ink by supplying the ink stored in the supply sub-tank to the discharge head, collecting the ink not discharged from the discharge head to the collection sub-tank and returning the ink stored in the collection sub-tank to the supply sub-tank via the connection pipe, the supply pipe connects the buffer tank and the collection sub-tank, the collection pipe connects the supply sub-tank and the buffer tank, and the ink circulation driver circulates the ink along a first circulation path composed of the buffer tank, the supply pipe, the collection sub-tank, the connection pipe, the supply sub-tank and the collection pipe in a first non-replenishment time during which the ink is not replenished.

A second aspect of the invention is a printing apparatus, comprising: a white drum tank configured to store a white ink; a white buffer tank configured to store the white ink replenished from the white drum tank; a white head unit configured to print a white image by discharging the white ink supplied from the white buffer tank to a recording surface of a printing medium; and a white ink circulator configured to circulate the white ink between the white drum tank and the white buffer tank in a second non-replenishment time during which the white ink is not replenished.

A third aspect of the invention is a printing method for replenishing an ink stored in a buffer tank to a head unit including a discharge head for printing by discharging the ink from a nozzle to a recording surface of a printing medium, the method comprising: printing by discharging the ink to the recording surface of the printing medium from the nozzle of the discharge head while circulating the ink in the head unit by supplying the ink stored in a supply sub-tank to the discharge head, collecting the ink not discharged from the discharge head to a collection sub-tank and returning the ink stored in the collection sub-tank to the supply sub-tank; and circulating the ink through the buffer tank for storing the ink, the collection sub-tank and the supply sub-tank in this order in a first non-replenishment time during which the ink is not replenished.

A fourth aspect of the invention is a printing method, comprising: replenishing a white ink from a white drum tank to a white buffer tank; printing a white image by discharging the white ink supplied from the white buffer tank to a recording surface of a printing medium by a white head unit; and circulating the white ink between the white drum tank and the white buffer tank in a second non-replenishment time during which the white ink is not replenished.

In the invention (first and third aspects) thus configured, the ink is circulated in the circulation path including the supply sub-tank, the discharge head and the collection sub-tank in the head unit. Here, if the amount of the ink in the head unit decreases, the ink stored in the buffer tank is replenished to the head unit. On the other hand, in the first non-replenishment time during which the ink is not replenished, the ink is circulated through the buffer tank, the collection sub-tank and the supply sub-tank in this order. Thus, a temperature fluctuation of the replenishment ink stored in the buffer tank is suppressed. As a result, even if the ink is replenished to the head unit from the buffer tank, physical properties, particularly a viscosity, of the ink do not largely vary.

Further, in the invention (second and fourth aspects) thus configured, the white ink is replenished from the white drum tank to the white buffer tank. The white ink is circulated to flow between the white drum tank and the white buffer tank in a time other than the replenishment time, i.e. in the second non-replenishment time. Thus, a problem of the conventional art that physical properties, particularly a density, of the ink becomes unstable when the white ink is replenished to the buffer tank is solved. Note that "between the white drum tank and the white buffer tank" means both from the white drum tank to a position before the white buffer tank reached immediately before the replenishment of the ink as described in embodiments later and from the white drum tank to the white buffer tank as described in a modification later.

As described above, according to the invention, high-quality printing is possible by suppressing physical property variations of the ink associated with ink replenishment.

All of a plurality of constituent elements of each aspect of the invention described above are not essential and some of the plurality of constituent elements can be appropriately changed, deleted, replaced by other new constituent elements or have limited contents partially deleted in order to solve some or all of the aforementioned problems or to achieve some or all of effects described in this specification. Further, some or all of technical features included in one aspect of the invention described above can be combined with some or all of technical features included in another aspect of the invention described above to obtain one independent form of the invention in order to solve some or all of the aforementioned problems or to achieve some or all of the effects described in this specification.

DETAILED DESCRIPTION OF THE PREFERRED EMBODIMENTS

Figure 1:
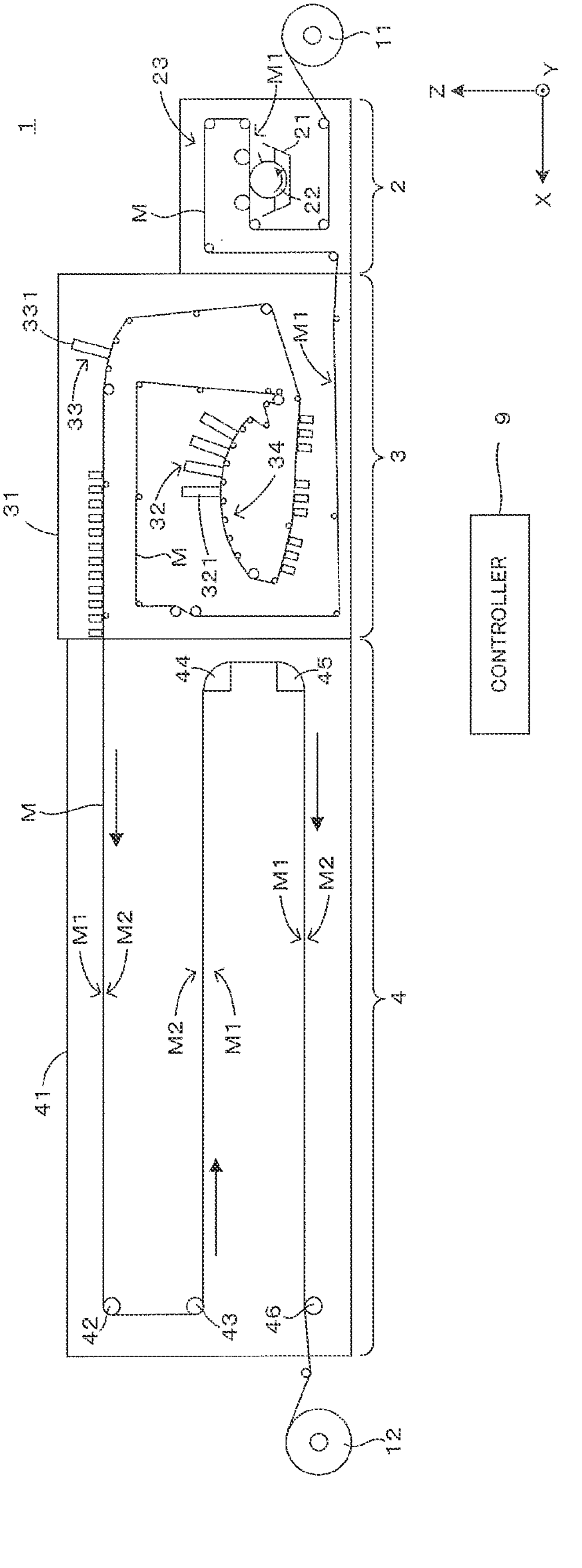
FIG. 1 is a front view schematically showing an example of a printing system equipped with a first embodiment of a printing apparatus according to the invention.

FIG. 1 is a front view schematically showing an example of a printing system equipped with a first embodiment of a printing apparatus according to the invention. In FIG. 1 and subsequent figures, a horizontal direction in which a coating apparatus 2, a printing apparatus 3 and a drying apparatus 4 constituting a printing system 1 are arranged is referred to as an "X direction", a horizontal direction from a right side toward a left side of FIG. 1 is referred to as a "+X direction" and an opposite direction is referred to as a "−X direction" to clarify an arrangement relationship of each component of the apparatus. Further, out of horizontal directions Y orthogonal to the X direction, a direction forward of the apparatuses is referred to as a "+Y direction" and a direction backward of the apparatuses is referred to as a "−Y direction". Further, upward and downward directions along a vertical direction Z are respectively referred to as a "+Z direction" and a "−Z direction".

This printing system 1 applies a coating process, a printing process and a drying process to a printing medium M while conveying the printing medium M in the form of a long strip from a feeding roll 11 to a winding roll 12 in a roll-to-roll manner by controlling each component of the apparatuses by a controller 9. That is, the coating apparatus 2 applies a coating liquid to the printing medium M. Then, the printing apparatus 3 prints an image by causing various inks to adhere to the printing medium M in an ink-jet method. Further, the drying apparatus 4 dries the inks adhering to the printing medium M. A material of the printing medium M is a film made of OPP (oriented polypropylene), PET (polyethylene terephthalate) or the like. However, the material of the printing medium M is not limited to the film and may be paper or the like. Such a printing medium M is flexible. Further, out of both surfaces of the printing medium M, the printed surface on which images are to be printed is referred to as a front surface M1 and the surface opposite to the front surface M1 is referred to as a back surface M2 as appropriate.

The coating apparatus 2 includes a pan 21 storing a liquid primer (coating liquid), a gravure roller 22 partially immersed in the primer stored in the pan 21 and a conveying unit 23 conveying the printing medium M. In the coating apparatus 2, a coating region is provided where the gravure roller 22 contacts the printing medium M conveyed by the conveying unit 23 from below, and the conveying unit 23 conveys the printing medium M along the coating region with the front surface M1 of the printing medium M facing down. On the other hand, the gravure roller 22 supplies the primer to the coating region by rotating while holding the primer on the peripheral surface thereof. In this way, the primer supplied by the gravure roller 22 is applied to the front surface M1 of the printing medium M in the coating region. Further, in the coating region, a moving direction of the printing medium M and a rotating direction of the peripheral surface of the gravure roller 22 are opposite. That is, the primer is applied to the printing medium M by a reverse kiss method. Then, the conveying unit 23 carries out the printing medium M from the coating apparatus 2 to the printing apparatus 3 with the front surface M1 of the printing medium M having the primer applied thereto facing up.

The printing apparatus 3 includes a housing 31, a color printing unit 32 arranged in the housing 31, a white printing unit 33 arranged above the color printing unit 32 in the housing 31, and a conveying unit 34 conveying the printing medium M by a plurality of rollers arranged in the housing 31.

The color printer 32 includes a plurality of (four) head units 321 arrayed in a moving direction of the printing medium M above the printing medium M being conveyed by the conveyor 34. Each head unit 321 includes a plurality of discharge heads and discharges an ink of one of mutually different colors from nozzles of the discharge heads facing the front surface M1 of the printing medium M passing therebelow from above in the ink-jet method. Further, a color ink supply mechanism for supplying the color ink to the discharge heads of the head unit 321 is provided for each color. That is, a color image is printed on the front surface M1 of the printing medium M by the color ink discharged from the discharge heads while the color ink is supplied to the discharge heads of the head unit 321 by the ink supply mechanism. Here, the color inks mean inks other than that having a white color and include inks of cyan, magenta, yellow, black and the like.

Further, the white printer 33 includes a single head unit 331 arranged above the printing medium M being conveyed by the conveyor 34. The head unit 331 includes a plurality of discharge heads and discharges a white ink from nozzles of the discharge heads facing the front surface M1 of the printing medium M passing therebelow from above in the ink-jet method. Further, a white ink supply mechanism is provided which supplies the white ink to the discharge heads of the head unit 331. That is, a white image is printed on the front surface M1 of the printing medium M by the white ink discharged from the discharge heads while the white ink is supplied to the discharge heads of the head unit 331 by the ink supply mechanism. The configurations and operations of the ink supply mechanisms are described in detail later.

Although not shown in FIG. 1, two types of dryers are provided in the housing 31 of the printing apparatus 3. One dryer is a pre-dryer for drying the color inks adhered to the surface M1 of the printing medium M by the color printer 32. The other dryer is an upper dryer for drying the white ink adhered to the surface M1 of the printing medium M by the white printer 33.

The drying apparatus 4 dries the inks adhering to the surface M1 of the printing medium M being conveyed from the printing apparatus 3. The drying apparatus 4 includes a housing 41 (drying furnace). Further, in the housing 41, rollers 42, 43 and 46 are arranged on a (+X) side and air turn bars 44, 45 are arranged on a (−X) side. By this arrangement, a substantially S-shaped conveyance path when viewed from a (+Y) side is configured, and the printing medium M is conveyed along this conveyance path. The inks adhering to the surface M1 of the printing medium M are dried during this conveyance. Then, the printing medium M subjected to the drying process is carried out from the drying apparatus 4 and wound on the winding roll 12.

Figure 2A:
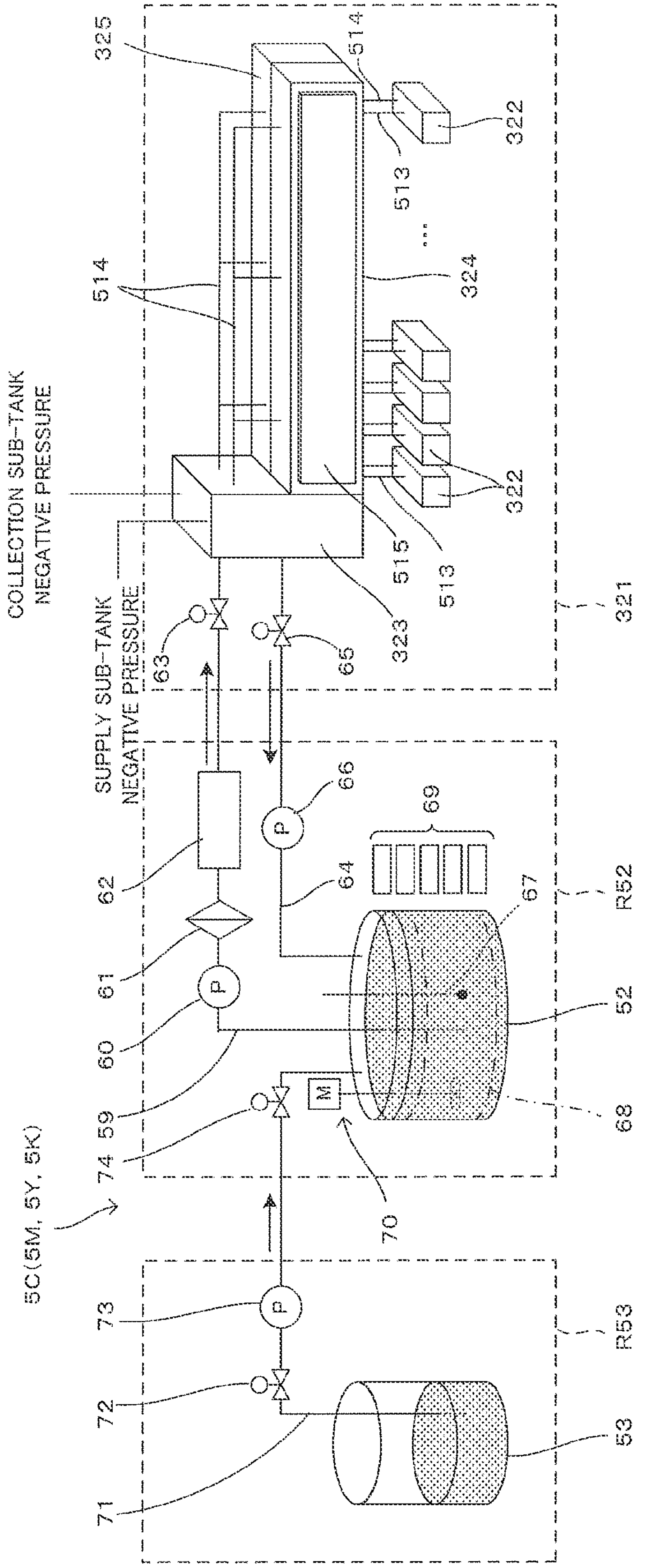
FIG. 2A is a schematic diagram showing the configuration of the color ink supply mechanism.
Figure 2B:
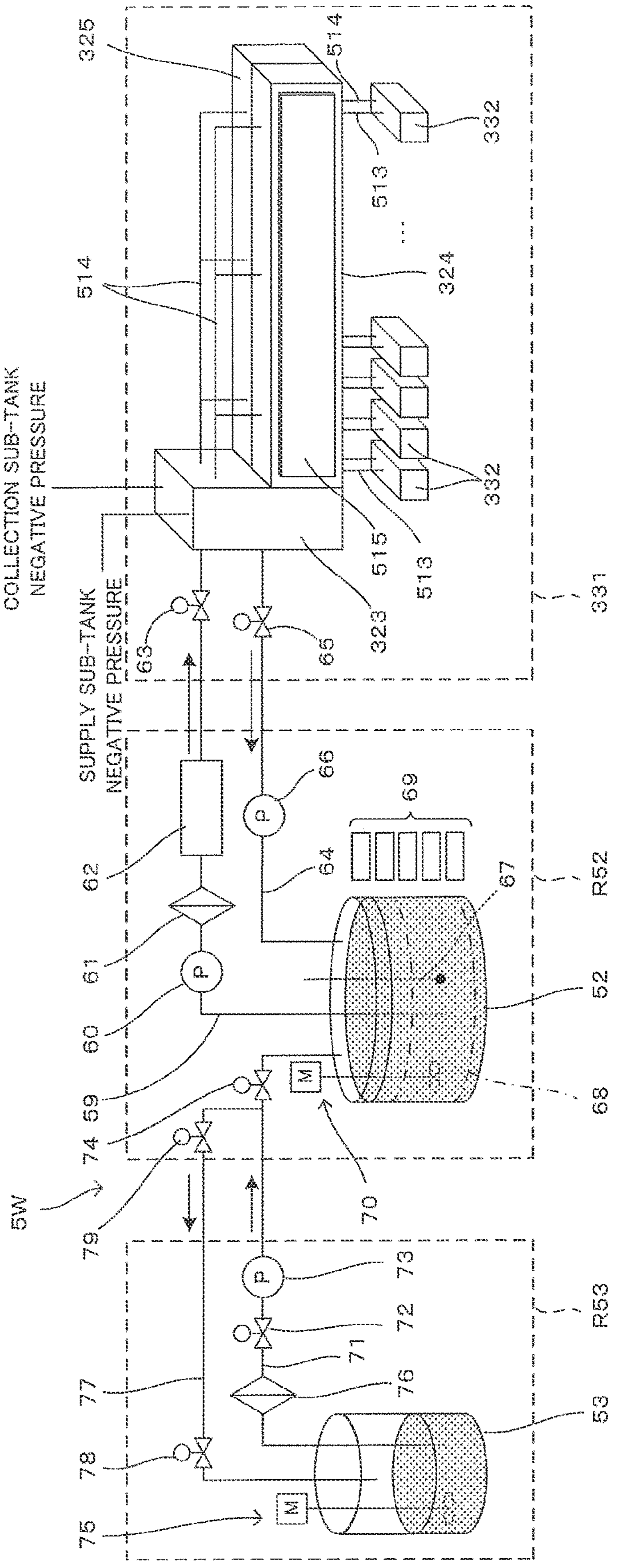
FIG. 2B is a schematic diagram showing the configuration of the white ink supply mechanism.
Figure 3A:
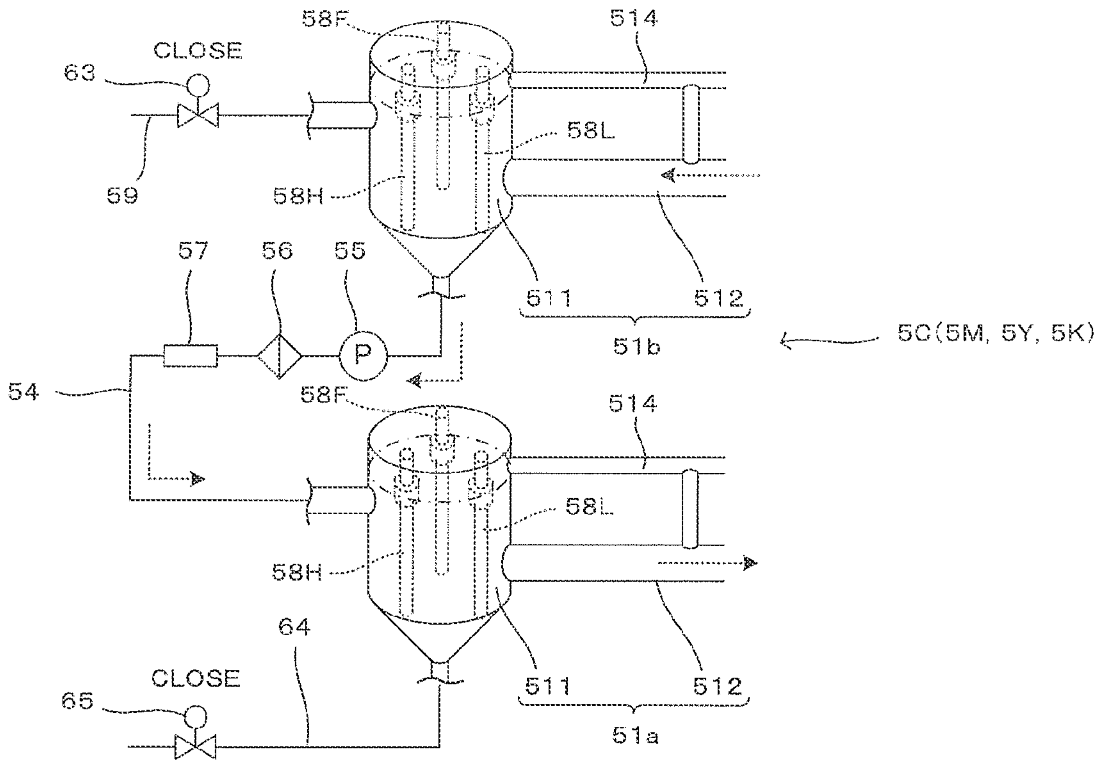
FIGS. 3A and 3B are diagrams schematically showing the configuration of sub-tanks.
Figure 3B:
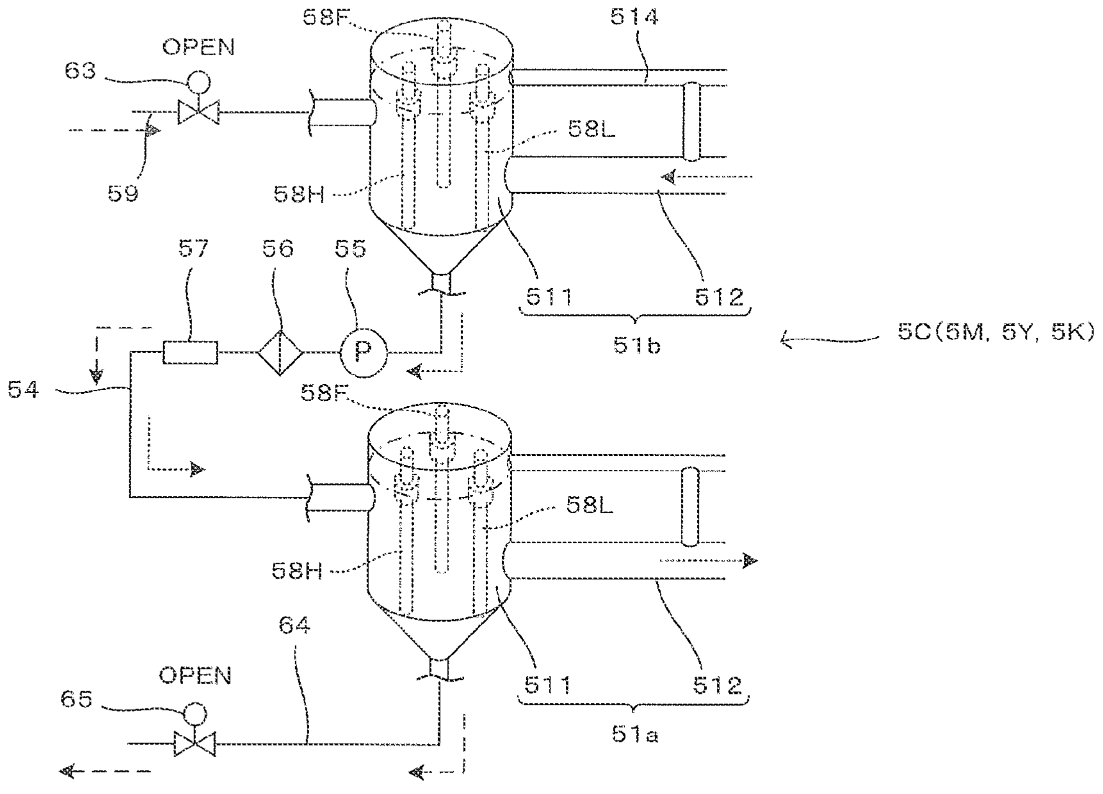

FIG. 2A is a schematic diagram showing the configuration of the color ink supply mechanism and FIG. 2B is a schematic diagram showing the configuration of the white ink supply mechanism. FIGS. 3A and 3B are diagrams schematically showing the configuration of sub-tanks. Ink supply mechanisms 5C, 5M, 5Y and 5K for supplying the inks of cyan, magenta, yellow and black and a white ink supply mechanism 5W are described below. Note that since the ink supply mechanisms 5C, 5M, 5Y and 5K have the same configuration, the configuration of the ink supply mechanism 5C is described and those of the remaining ink supply mechanisms 5M, 5Y and 5K are not described. Following the description of this ink supply mechanism 5C, the configuration of the ink supply mechanism 5W is described.

The ink supply mechanism 5C includes two sub-tanks 51*a*, 51*b* arranged in the head unit 321 (see FIGS. 3A and 3B), a buffer tank 52 arranged in a region R52 distant from the head unit 321 in a housing of the printing apparatus 3 and a drum tank 53 arranged in a drum storage region R53 distant from the printing system 1 as tanks for storing the ink. The two sub-tanks 51*a*, 51*b* have a function of temporarily storing the ink, but the amount of the ink that can be stored in each sub-tank 51, 51*b* is small. If the amount of the ink stored in one of the sub-tanks 51*a*, 51*b* decreases, the ink is replenished from the buffer tank 52. Thus, the amount of the ink stored in the buffer tank 52 is more than the amounts of the ink stored in the sub-tanks 51, 51*b*. Further, if the amount of the ink decreases also in the buffer tank 52, the ink is replenished from the drum tank 53 storing a large amount of the ink. The ink replenishment from the buffer tank 52 is referred to as "first replenishment", the ink replenishment from the drum tank 53 is referred to as "second replenishment" and the first replenishment and the second replenishment are distinguished and described in this specification.

The sub-tank 51*a* receives a supply sub-tank negative pressure from an unillustrated negative pressure supplier and functions as a supply sub-tank for supplying the ink to a plurality of discharge heads 322 arrayed in the horizontal direction as shown in FIG. 2A. This supply sub-tank 51*a* includes a vertical tank 511 and a horizontal tank 512 as shown in FIGS. 3A and 3B. The vertical tank 511 is arranged inside a vertical tank container 323 of the head unit 321. On the other hand, the horizontal tank 512 is arranged inside a horizontal tank container 324. This horizontal tank container 324 is provided at a position above the plurality of discharge heads 322 arrayed in the horizontal direction and in parallel to a row of the discharge heads as shown in FIG. 2A. Inside the horizontal tank container 324, one end part of the horizontal tank 512 communicates with a vertically central part of the vertical tank 511 and the other end part thereof extends in the horizontal direction as shown in FIGS. 3A and 3B. Further, for each discharge head 322, a pipe 513 extends downward from the horizontal tank 512 and is connected to the discharge head 322 as shown in FIG. 2A. Thus, the ink can be supplied from the supply sub-tank 51*a* (=511+512) to the discharge heads 322.

The other sub-tank 51*b* receives a collection sub-tank negative pressure larger than the supply sub-tank negative pressure from the negative pressure supplier and functions as a collection sub-tank for collecting the ink discharged from the plurality of discharge heads 322. The collection sub-tank 51*b* includes a vertical tank 511 and a horizontal tank 512, similarly to the supply sub-tank 51*a*. The vertical tank 511 is provided in parallel to the vertical tank 511 of the supply sub-tank 51*a* inside the vertical tank container 323. On the other hand, the horizontal tank 512 is arranged inside a horizontal tank container 325. This horizontal tank container 325 is provided in parallel to the horizontal tank container 324. Inside the horizontal tank container 325, one end part of the horizontal tank 512 communicates with a vertically central part of the vertical tank 511 and the other end part extends in the horizontal direction as shown in FIGS. 3A and 3B. Further, for each discharge head 322, a pipe 514 extends downward from the horizontal tank 512 and is connected to the discharge head 322 as shown in FIG. 2A. Thus, the ink can be collected from the discharge heads 322 to the collection sub-tank 51*b* (=511+512).

Note that 514 in FIGS. 3A and 3B denotes air pipes for smoothly performing the above ink supply and collection. Further, 515 denotes a silicon rubber heater attached to a side surface of the horizontal tank container 324 and functioning to adjust a temperature of the ink stored in the horizontal tank 512 of the supply sub-tank 51*a*. Further, although not shown in FIG. 2A, a silicon rubber heater 515 is attached also to a side surface of the other horizontal tank container 325 and functions to adjust a temperature of the ink stored in the horizontal tank 512 of the collection sub-tank 51*b*.

The supply sub-tank 51*a* and the collection sub-tank 51*b* thus configured are connected to each other via a pipe 54 as shown in FIGS. 3A and 3B. In particular, one end of the pipe 54 is connected to the vertical tank 511 of the supply sub-tank 51*a* and the other end of the pipe 54 is connected to the vertical tank 511 of the collection sub-tank 51*b*. In this way, the pipe 54 connects the supply sub-tank 51*a* and the collection sub-tank 51*b* as a flow passage. Further, a pump 55, a filter 56 and a degassing unit 57 are disposed in the pipe 54. Thus, by the operation of the pump 55 in response to an operation command from the controller 9, the ink is fed from the collection sub-tank 51*b* to the supply sub-tank 51*a* while foreign matter components and gas components are removed from the ink as indicated by dotted-line arrows in FIG. 3A. That is, the ink can be supplied to the discharge heads 322 while being circulated along a circulation path composed of the supply sub-tank 51*a*, the pipes 513, the discharge heads 322, the pipes 514, the collection sub-tank 51*b* and the pipe 54. This ink circulation is referred to as "in-head circulation" in this specification.

Since a printing process is performed by discharging the ink from the discharge heads 322 while the ink is circulated in this embodiment, the amounts of the ink stored in the supply sub-tank 51*a* and the collection sub-tank 51*b* change. Accordingly, three floating-type level sensors 58F, 58H and 58L for detecting a liquid level of the ink stored in the vertical tank 511 of the supply sub-tank 51*a* are provided as shown in FIGS. 3A and 3B. Out of these, the level sensor 58F detects the overflowing of the ink from the vertical tank 511. On the other hand, the level sensors 58H, 58L are sensors for specifying a planned storage range. That is, the level sensor 58H detects that the liquid level has reached an upper limit of the planned storage range of the ink in the vertical tank 511. The level sensor 58L detects that the liquid level has reached a lower limit of the planned storage range. Signals representing detection results by these level sensors 58F, 58H and 58L are output to the control unit 9. Therefore, the control unit 9 having received these detection signals can precisely determine in real time in which of the following four statuses the liquid level of the ink stored in the vertical tank 511 of the supply sub-tank 51*a* is:

Low . . . The liquid level is below the planned storage range,

Mid . . . The liquid level is in the planned storage range,

High . . . The liquid level is beyond the planned storage range, but not overflowing, and Ovf . . . The ink is overflowing.

Particularly, the level sensors 58H, 58L detect the position of the ink liquid level with respect to the planned storage range in the vertical direction and function as a "supply-side level sensor" of the invention.

The vertical tank 511 of the collection sub-tank 51*b* is also provided with the above level sensors 58F, 58H and 58L and can precisely determine in real time in which of the above four statuses the liquid level of the ink stored in the vertical tank 511 of the collection sub-tank 51*b* is. Particularly, the level sensors 58H, 58L detect the position of the liquid level with respect to the planned storage range in the vertical direction and function as a "collection-side level sensor" of the invention.

Although the floating-type sensors are used as the level sensors for detecting the liquid level in this embodiment, the type of the level sensors is not limited to this and level sensors of another type conventionally frequently used may be used.

In the ink supply mechanism 5C, a pipe 59 connecting the buffer tank 52 and the vertical tank 511 of the collection sub-tank 51*b* is provided to replenish the ink from the buffer tank 52 to the head unit 321 configured as described above, i.e. to perform the first replenishment. In particular, one end of the pipe 59 extends into an ink region (dotted region in FIG. 2A) stored in the buffer tank 52. On the other hand, the other end of the pipe 59 is connected to an upper end part of the vertical tank 511. Further, a pump 60, a filter 61, a degassing unit 62 and a valve 63 are disposed in the pipe 59. Thus, by opening the valve 63 and operating the pump 60 by the control unit 9, the ink stored in the buffer tank 52 is fed to the collection sub-tank 51*b* via the pipe 59. In this way, the ink is replenished from the buffer tank 52 to the head unit 321, i.e. the first replenishment is performed.

A pipe 64 is added to circulate the ink between the head unit 321 and the buffer tank 52 during a period while the first replenishment is not performed (corresponding to an example of a "first non-replenishment time" of the invention) in addition to for the first replenishment. As shown in FIGS. 3A and 3B, one end of the pipe 64 is connected to a bottom part of the vertical tank 511 of the supply sub-tank 51*a*. The other end of the pipe 64 extends into the buffer tank 52 as shown in FIG. 2A. Further, a valve 65 and a pump 66 are disposed in the pipe 64. Thus, by opening the valve 65 and operating the pump 66 by the control unit 9, the ink stored in the supply sub-tank 51*a* is fed to the buffer tank 52 via the pipe 64. That is, an ink circulation path composed of the buffer tank 52, the pipe 59, the collection sub-tank 51*b*, the pipes 513, the supply sub-tank 51*a* and the pipe 64 is formed by adding the pipe 64. This circulation path formed between the buffer tank 52 and the head unit 321 is different from the above in-head circulation and referred to as a "BH circulation path" below. Therefore, by opening the valves 63, 65 and operating the both pumps 60, 66 in response to a command from the control unit 9, the ink is circulated along the BH circulation path as indicated by broken-line arrows in FIG. 3B.

As shown in FIG. 2A, a temperature sensor 67 for detecting a temperature of the stored ink is provided in the buffer tank 52, and a temperature signal output from that temperature sensor 67 is output to the control unit 9. Further, a silicon rubber heater 68 is attached to an outer wall of the buffer tank 52. Thus, by controlling the silicon rubber heater 68 based on the temperature signal by the control unit 9, the ink temperature in the buffer tank 52 can be accurately adjusted.

Further, a level sensor 69 is provided in the buffer tank 52, detects a height level of the stored ink in five stages and outputs a detection result thereof to the control unit 9.

Furthermore, a stirring unit 70 is provided in the buffer tank 52 and prevents density unevenness by stirring the ink stored in the buffer tank 52.

In the ink supply mechanism 5C, a pipe 71 connecting the drum tank 53 and the buffer tank 52 is provided to replenish the ink from the drum tank 53 to the buffer tank 52 configured as described above, i.e. to perform the second replenishment. In particular, one end of the pipe 71 extends into an ink region (dotted region in FIG. 2A) stored in the drum tank 53. The other end of the pipe 71 extends to the buffer tank 52. Further, a valve 72, a pump 73 and a valve 74 are disposed in the pipe 71. Thus, by opening the valves 72, 74 and operating the pump 73 by the control unit 9, the ink stored in the drum tank 53 is fed to the buffer tank 52 via the pipe 71. In this way, the ink is replenished from the drum tank 53 to the buffer tank 52, i.e. the second replenishment is performed.

Next, the configuration of the white ink supply mechanism 5W is described with reference to FIGS. 2B, 3A and 3B. The ink supply mechanism 5W largely differs from the color ink supply mechanisms 5C, 5M, 5Y and 5K in the following three points and the other configuration is the same. Note that, in the configuration of the white ink supply mechanism 5W, the head unit is denoted by 331 and the discharge heads are denoted by 332 in FIG. 2B. The other components similar to those of the ink supply mechanism 5C are denoted by the same reference signs as in the ink supply mechanism 5C described above.

A first point of difference is that a stirring unit 75 is provided. Density unevenness is effectively prevented by stirring the white ink stored in a buffer tank 52 by the stirring unit 75. A second point of difference is that a filter 76 is disposed in a pipe 71 to remove foreign matters from the white ink. A third point of difference is that a circulation path for circulating the white ink (hereinafter, referred to as a "DP circulation path") is formed among a drum tank 53, the pipe 71 and a pipe 77 by branching the pipe 77 from an intermediate part of the pipe 71. That is, the pipe 77 is branched between a pump 73 and a valve 74 and the tip thereof extends to the drum tank 53. Valves 78, 79 are respectively disposed in a drum tank-side end part and a buffer tank-side end part of this pipe 77. Thus, the second replenishment is performed as in the ink supply mechanisms 5C, 5M, 5Y and 5K with the valves 78, 79 closed in response to a command from the control unit 9. On the other hand, by operating the pump 73 with the valve 74 closed and the valves 72, 78 and 79 opened in response to a command from the control unit 9, the white ink is circulated along the DP circulation path. As a result, the following functions and effects are obtained.

Also in this embodiment, as in the conventional art, the white ink is replenished from the drum tank 53 to the buffer tank 52 by one pipe 71. Here, if the white ink stands still in the pipe 71 during a period while the second replenishment is not performed (corresponding to an example of a "second non-replenishment time" of the invention), pigments contained in the white ink are precipitated to generate an ink density distribution while the white ink is standing still. However, the DP circulation path is provided in this embodiment. Accordingly, the precipitation of the pigments can be effectively prevented by circulating the white ink along the DP circulation path in the second non-replenishment time. As a result, the problem in the conventional art, i.e. a reduction in print quality due to pigment precipitation in the white ink can be effectively prevented.

Figure 4:
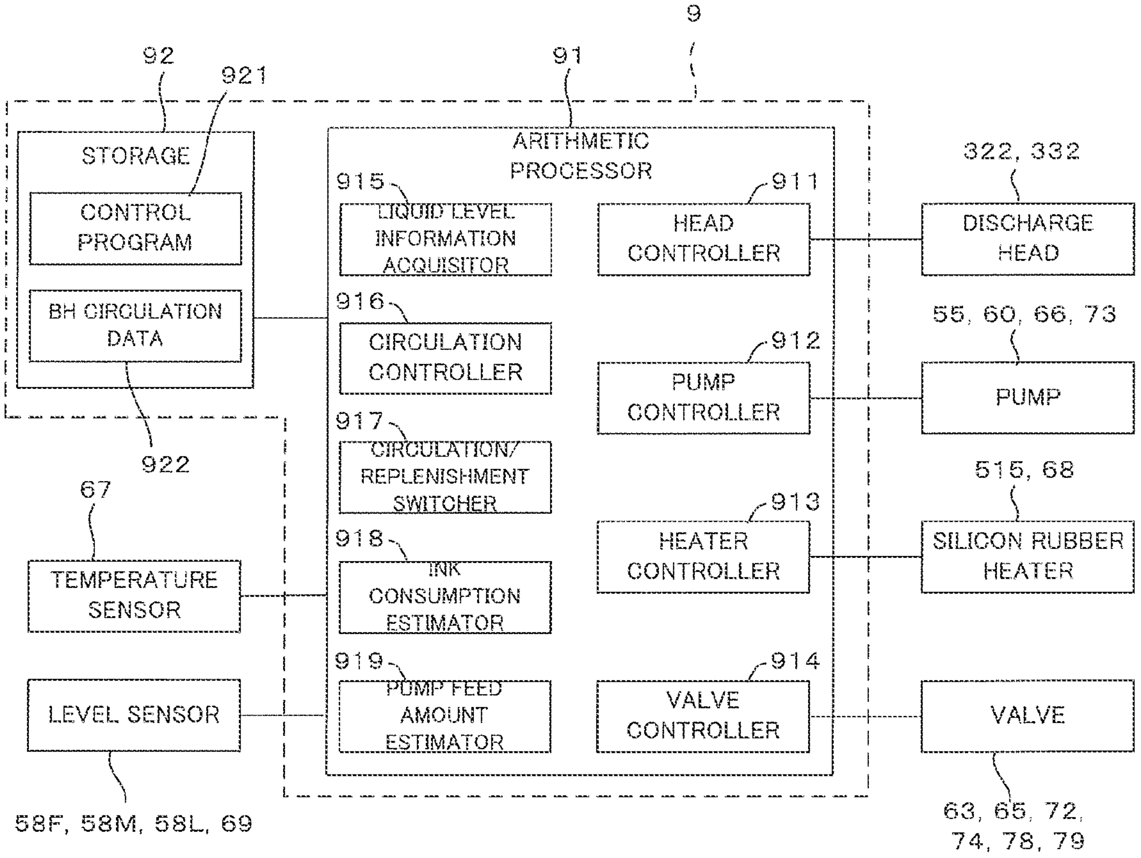
FIG. 4 is a block diagram showing an electrical configuration of the control unit for controlling the head units and the ink supply mechanisms of the printing apparatus.

FIG. 4 is a block diagram showing an electrical configuration of the control unit for controlling the head units and the ink supply mechanisms of the printing apparatus. Although the discharge, supply and replenishment of the color inks and the white ink are totally controlled by one control unit 9 in this embodiment, control units may be, of course, separately provided for the color inks and the white ink or a control unit may be provided for each color of the ink. The discharge, supply and replenishment of the white ink are described below.

The control unit 9 includes an arithmetic processor 91 and a storage 92. The arithmetic processor 91 performs calculations necessary to control the discharge of the ink by the discharge heads 332 and is, for example, constituted by a FPGA (Field-Programmable Gate Array), processor or the like. Further, the storage 92 stores various pieces of information and is, for example, constituted by an HDD (Hard Disk Drive) or the like.

The arithmetic processor 91 includes a head controller 911 for controlling the discharge of the inks from the respective nozzles of the discharge heads 322, 332. This head controller 911 controls the discharge heads 322, 332 based on print image information. This print image information represents an image to be printed by the inks discharged from the discharge heads 322, 332, and the head controller 911 causes the respective nozzles of the discharge heads 322, 332 to discharge ink dots in accordance with the print image information, whereby an image is printed on the printing medium M. Specifically, this print image information is, for example, data after a halftone processing.

Further, the arithmetic processor 91 includes a pump controller 912, a heater controller 913, a valve controller 914, a liquid level information acquisitor 915, a circulation controller 916, a circulation/replenishment switcher 917, an ink consumption estimator 918 and a pump feed amount estimator 919. The pump controller 912 controls the pumps 55, 60, 66 and 73 provided in the respective components of the apparatus. The heater controller 913 controls the silicon rubber heaters 515, 68. The valve controller 914 controls the opening and closing of the valves 63, 65, 72, 74, 78 and 79. The liquid level information acquisitor 915 acquires information on the liquid levels of the inks stored in the tanks based on outputs from the level sensors 58F, 58H, 58L and 69. The circulation controller 916 controls the circulation of the ink along the BH circulation path by determining a mode in circulating the ink along the BH circulation path. The circulation/replenishment switcher 917 switches between the circulation of the white ink along the DP circulation path and the replenishment of the white ink to the buffer tank 52 by the pipe 71. The ink consumption estimator 918 estimates the amounts of the inks consumed by the discharge heads 322, 332 based on the number of times of discharging the ink dots from the respective nozzles of the discharge heads 322, 332. The pump feed amount estimator 919 estimates feed amounts of the inks by the operations of the pumps 55, 60, 66 and 73.

The storage 92 stores a control program 921 for controlling each component of the apparatus and BH circulation data 922 describing circulation modes in circulating the ink in the BH circulation path in a table format in advance. The arithmetic processor 91 reads the control program 921 from the storage 92 and performs a printing operation by controlling each component of the apparatus in accordance with the control program 921. While the apparatus is powered on, the arithmetic processor 91 continuously performs a BH circulation operation for each color and further continuously performs a circulation/replenishment switching operation for the white ink. The BH circulation operation and the circulation/replenishment switching operation are successively described below.

Figure 5:
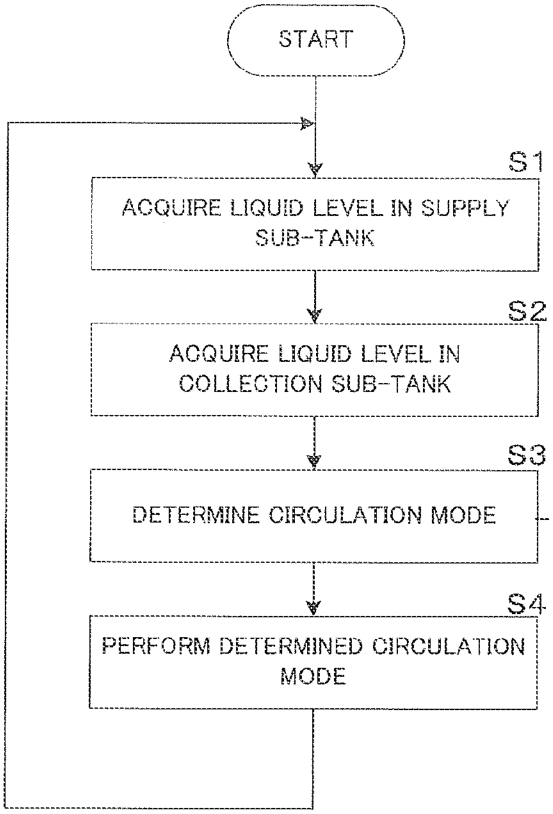
FIG. 5 is a flow chart showing the BH circulation operation.
Figure 6:
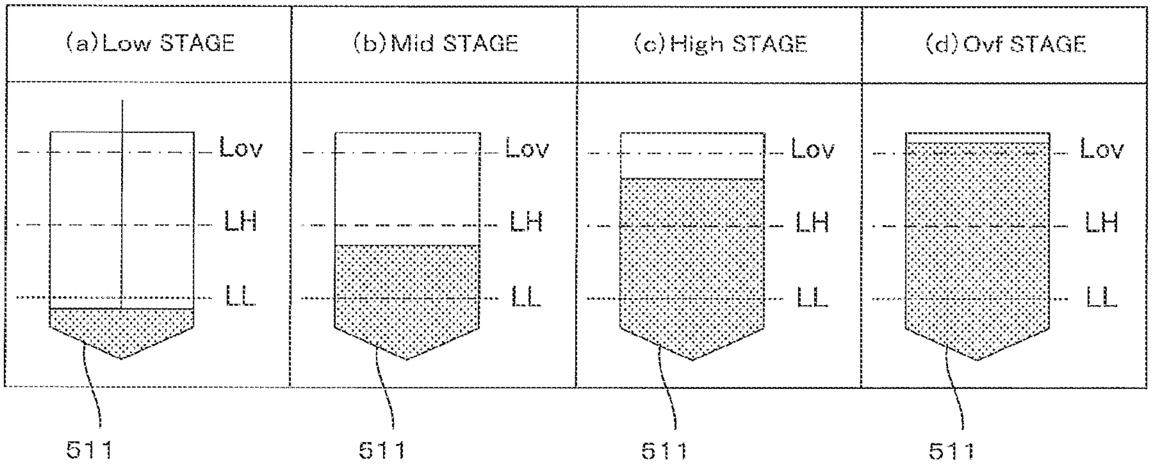
FIG. 6 is a chart schematically showing the liquid levels in the sub-tank detected by the level sensors.

FIG. 5 is a flow chart showing the BH circulation operation. FIG. 6 is a chart schematically showing the liquid levels in the sub-tank detected by the level sensors. The arithmetic processor 91 repeatedly performs Steps S1 to S4 while the apparatus is powered on. In Step S1, the liquid level information acquisitor 915 of the arithmetic processor 91 acquires the liquid level status of the ink stored in the vertical tank 511 of the supply sub-tank 51*a* based on outputs from the level sensors 58F, 58H and 58L provided in the supply sub-tank 51*a*. For example, as shown in a field (a) of FIG. 6, the liquid level is not detected by the level sensors 58F, 58H and 58L if the liquid level of the ink has not reached any one of a detection level Lov of the level sensor 58F, a detection level LH of the level sensor 58H and a detection level LL of the level sensor 58L. Based on this sensor output situation, the liquid level information acquisitor 915 determines that the current liquid level status is a Low state. Further, if only the level sensor 58L detects the ink, the liquid level information acquisitor 915 determines that the current liquid level status is a Mid state (see a field (b) of FIG. 6). Further, if the level sensors 58L, 58H detects the liquid level, the liquid level information acquisitor 915 determines that the current liquid level status is a High state (see a field (c) of FIG. 6). Further, if the level sensor 58F detects the ink, the liquid level information acquisitor 915 determines that the current liquid level status is an Ovf state (see a field (d) of FIG. 6).

In next Step S2, the liquid level information acquisitor 915 acquires the liquid level status of the ink stored in the vertical tank 511 of the collection sub-tank 51*b* based on outputs from the level sensors 58F, 58H and 58L provided in the collection sub-tank 51*b*.

When the confirmation of the liquid level statuses in the supply sub-tank 51*a* and the collection sub-tank 51*b* by the liquid level information acquisitor 915 is completed in this way, the circulation controller 916 determines the circulation mode corresponding to the liquid level statuses based on the BH circulation data 922 (Step S3). In this embodiment, as shown in a table of FIG. 5, an output ("Duty" in FIG. 5) of the pump 55, an ON/OFF switch of the pump 60 ("Supply" in FIG. 5) and an ON/OFF switch of the pump 66 ("MainRet" in FIG. 5) are set in advance according to a combination of the liquid level status ("Feed" in FIG. 5) of the supply sub-tank 51*a* and the liquid level status ("Return" in FIG. 5) of the collection sub-tank 51*b*. Note that "→", "↑", "↓" and "Zero" in a column "Duty" in FIG. 5 respectively mean the following operations:

"→" . . . Maintain the output of the pump 55,

"↑" . . . Increase the output of the pump 55 by a certain value,

"↓" . . . Decrease the output of the pump 55 by a certain value, and

"Zero" . . . Zero the output of the pump 55.

In next Step S4, the pump controller 912 switches the output of the pump 55 and the ON/OFF of the pumps 60, 66 in accordance with the circulation mode determined in Step S3. In this way, the ink is replenished to the head unit 331, i.e. the first replenishment is performed while the ink is circulated in the BH circulation path to correspond to the amounts of the ink stored in the supply sub-tank 51*a* and the collection sub-tank 51*b*.

This series of processings (Steps S1 to S4) are successively performed in a given cycle while the apparatus is powered on. Accordingly, the temperature of the ink stored in the buffer tank 52 and that of the ink circulating in the head unit 321, 332 are constantly equal. As a result, also when the ink is replenished to the head unit 321, 331, the ink temperature is stable in the head unit 321, 331 and print quality can be maintained by the head unit 321, 331. Such a BH circulation operation of the ink is performed not only in the white ink supply mechanism 5W, but also in the color ink supply mechanisms 5C, 5M, 5Y and 5K, and can maintain print quality by the head unit 321.

Figure 7:
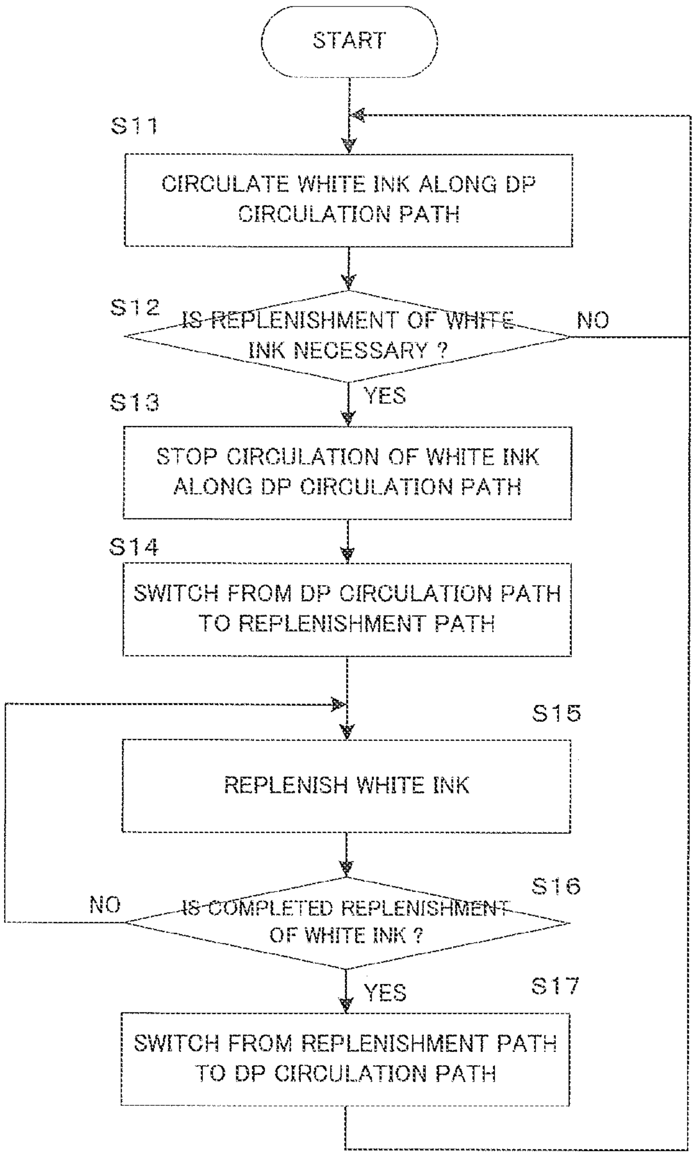
FIG. 7 is a flow chart showing the circulation/replenishment switching operation performed in the white ink supply mechanism.
Figure 8A:
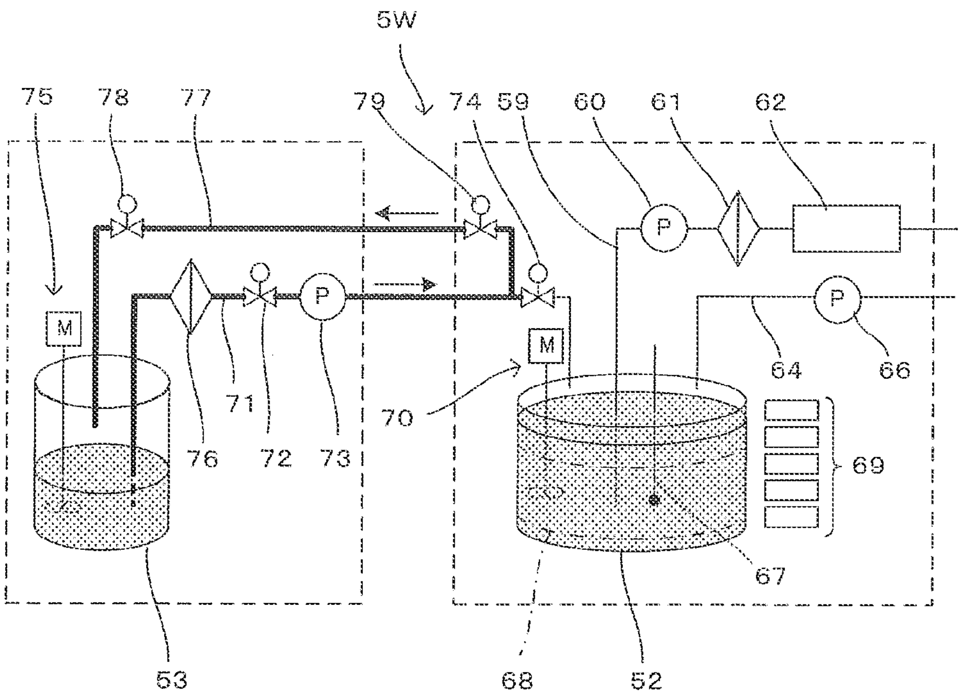
FIG. 8A is a diagram showing an ink circulation operation in the white ink supply mechanism.
Figure 8B:
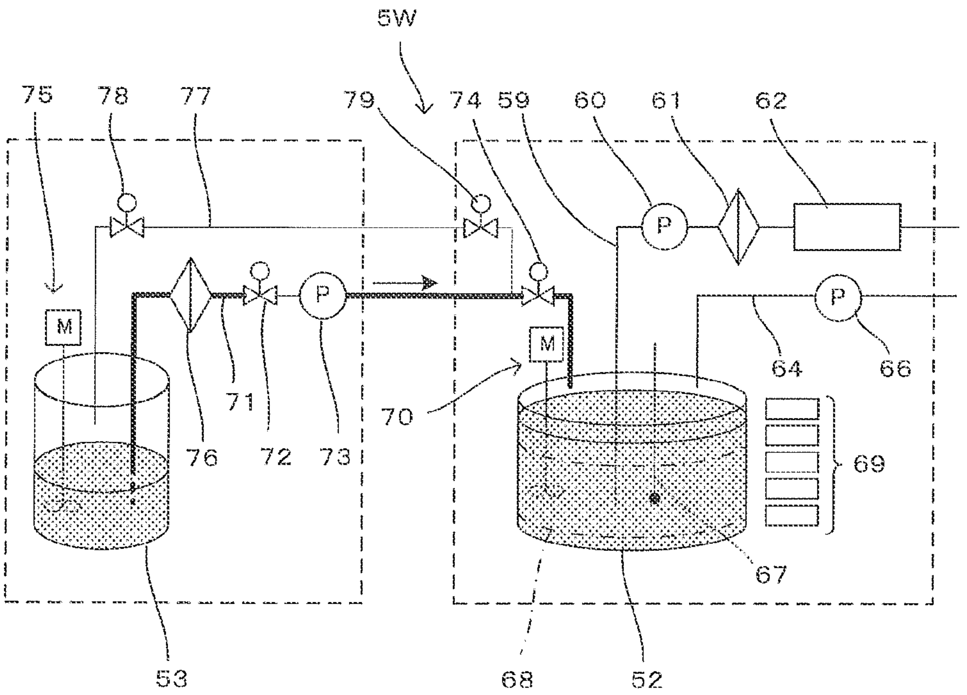
FIG. 8B is a diagram showing an ink replenishment operation in the white ink supply mechanism.

FIG. 7 is a flow chart showing the circulation/replenishment switching operation performed in the white ink supply mechanism. FIG. 8A is a diagram showing an ink circulation operation in the white ink supply mechanism and FIG. 8B is a diagram showing an ink replenishment operation in the white ink supply mechanism. The valve controller 914 of the arithmetic processor 91 opens the valves 72, 89 and 79 while closing the valve 74. Further, the pump controller 912 of the arithmetic processor 91 operates the pump 73. In this way, as shown in FIG. 8A, the white ink is circulated to flow along the DP circulation path during the period while the white ink is not replenished (i.e. in the second non-replenishment time) (Step S11).

On the other hand, if the arithmetic processor 91 determines that the replenishment of the white ink is necessary ("YES" in Step S12), the valve controller 914 switches the valve 79 from an open state to a closed state and switches the valve 74 from a closed state to an open state. In this way, the circulation of the white ink along the DP circulation path is stopped (Step S13). Further, a path of the white ink fed by the pump 73 is switched from the DP circulation path to the replenishment path as indicated by a thick line of FIG. 8 (Step S14).

Then, the pump controller 912 adjusts the output of the pump 73 to a value suitable for the replenishment of the white ink, i.e. the second replenishment and replenishes the white ink from the drum tank 53 to the buffer tank 52 (Step S15). The arithmetic processor 91 continues the second replenishment until the replenishment of the white ink to the buffer tank 52 is completed. When the completion of the second replenishment is confirmed ("YES" in Step S16), the valve controller 914 switches the valve 79 from the closed state to the open state and switches the valve 74 from the open state to the closed state. In this way, the path of the white ink fed by the pump 73 is returned from the replenishment path to the DP circulation path as indicated by the thick line of FIG. 8A (Step S17). Further, the pump controller 912 returns the output of the pump 73 to a value suitable for the circulation of the white ink.

This series of processings (Steps S11 to S17) are successively performed while the apparatus is powered on. Thus, the white ink is circulated along the DP circulation path immediately before the replenishment to the buffer tank 52 is performed. Thus, the white ink flows and is prevented from standing still in the second non-replenishment time. Therefore, the problem of the conventional art that the ink density becomes unstable when the white ink is replenished to the buffer tank 52 can be solved. As a result, a reduction in print quality by the second replenishment of the white ink can be effectively prevented.

In the first embodiment described above, the pipes 54, 59, 64 respectively correspond to examples of a "connection pipe", a "supply pipe" and a "collection pipe" of the invention. Further, the pumps 55, 60 and 66 respectively correspond to examples of a "connection pump", a "supply pump" and a "collection pump" of the invention and function as an "ink circulation driver" of the invention. Further, the BH circulation path corresponds to an example of a "first circulation path" of the invention. Further, the pipe 71 corresponds to an example of a "white replenishment pipe" of the invention. Further, the pipe 77 branched from the pipe 71 and extending to the drum tank 53 corresponds to an example of a "branch pipe" of the invention and functions as a "white ink circulator" of the invention. Further, the pump 73 corresponds to an example of a "white feeding pump" of the invention. Further, the buffer tank 52 and the pump 73 in the ink supply mechanism 5W respectively correspond to examples of a "white buffer tank" and a "white replenishment pump" of the invention. Furthermore, the head unit 331 corresponds to an example of a "white head unit" of the invention.

The invention is not limited to the embodiment described above and various changes other than the aforementioned ones can be made without departing from the gist of the invention. For example, the height position of the liquid level of the ink stored in the sub-tank with respect to the planned storage range is detected by two level sensors 58H, 58L in the first embodiment. Here, the number of the level sensors can be reduced by utilizing an estimated value of the ink consumption by the ink consumption estimator 918 and an estimated value of the ink feed amount by the pump feed amount estimator 919 (second embodiment).

Figure 9:
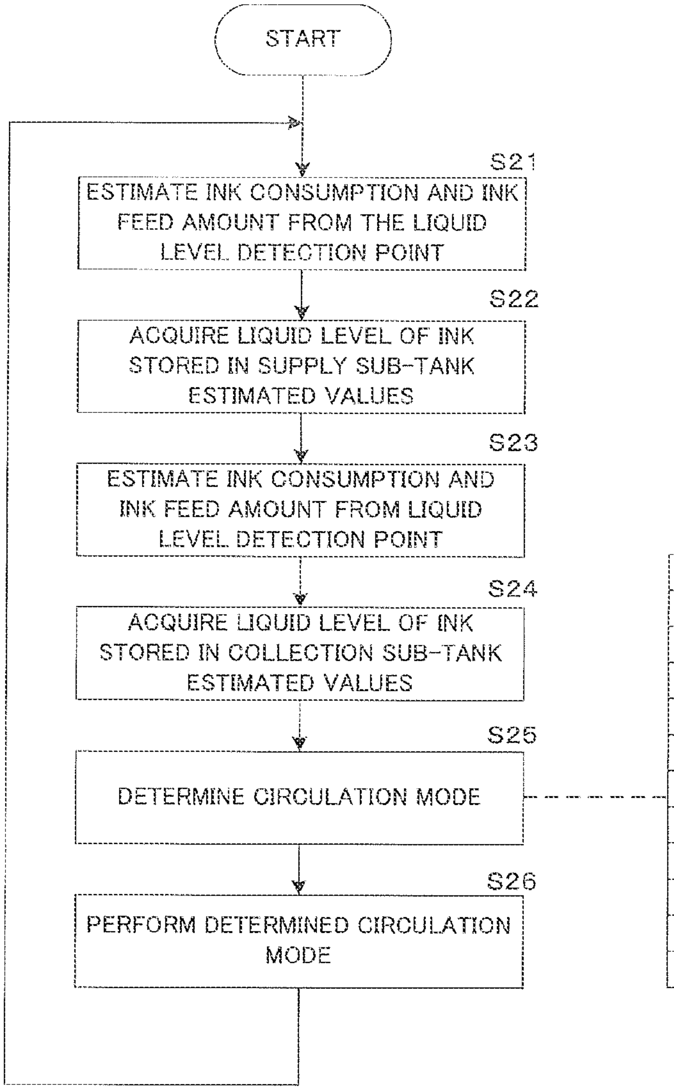
FIG. 9 is a flow chart showing a BH circulation operation in the second embodiment of the invention.

FIG. 9 is a flow chart showing a BH circulation operation in the second embodiment of the invention. In the second embodiment, one level sensor is provided which detects the liquid level of the ink stored in the vertical tank 511 of the supply sub-tank 51*a*. Further, one level sensor is also provided in the vertical tank 51 of the collection sub-tank 51*b*, similarly to the supply sub-tank 51*a*. Further, as shown in FIG. 9, the liquid level information acquisitor 915 acquires the liquid level in the sub-tank based on the liquid level detected by the level sensor, an ink consumption (estimated value) and an ink feed amount (estimated amount). Note that since the other components are the same as those of the first embodiment, the same components are denoted by the same reference signs in the following description.

In the second embodiment, the arithmetic processor 91 repeatedly performs Steps S21 to S26 while the apparatus is powered on. In Step S21, the ink consumption estimator 918 of the arithmetic processor 91 estimates the ink consumption from a liquid level detection point of time based on a count value of ink dots discharged from the nozzles from the liquid level detection point of time at which the liquid level of the ink stored in the supply sub-tank 51*a* was detected by the level sensor. Further, the pump feed amount estimator 919 of the arithmetic processor 91 estimates the ink feed amount from the liquid level detection point of time by each pump 55, 60, 66. Then, the liquid level information acquisitor 915 acquires the liquid level of the ink stored in the supply sub-tank 51*a* in real time based on these estimated values (Step S22).

Further, the liquid level information acquisitor 915 also acquires the liquid level of the collection sub-tank 51*b* in real time, similarly to that of the supply sub-tank 51*a* (Steps S23, S24). That is, the ink consumption estimator 918 estimates the ink consumption from a liquid level detection point of time based on a count value of the ink dots discharged from the nozzles from the liquid level detection point of time at which the liquid level of the ink stored in the collection sub-tank 51*b* is detected by the level sensor. Further, the pump feed amount estimator 919 of the arithmetic processor 91 estimates the ink feed amount from the liquid level detection point of time by each pump 55, 60, 66 (Step S23). Then, the liquid level information acquisitor 915 acquires the liquid level of the ink stored in the collection sub-tank 51*b* in real time based on these estimated values (Step S24).

When the confirmation of the liquid level statuses of the supply sub-tank 51*a* and the collection sub-tank 51*b* by the liquid level information acquisitor 915 is completed, the circulation controller 916 determines the circulation mode corresponding to the liquid level status based on the BH circulation data 922 (Step S25). Further, the pump controller 912 switches the output of the pump 55 and switches the ON/OFF of the pumps 60, 66 in accordance with this circulation mode. In this way, the ink is replenished to the head unit 321, 331, i.e. the first replenishment is performed while the ink is circulated in the BH circulation path to correspond to the amounts of the ink stored in the supply sub-tank 51*a* and the collection sub-tank 51*b* (Step S26).

This series of processings (Steps S21 to S26) are also successively performed in a given cycle while the apparatus is powered on, as in the first embodiment.

Further, whether or not the liquid level is in the range in each sub-tank 51*a*, 51*b* is directly detected by two level sensors 58H, 58L in the first embodiment, and indirectly detected by one level sensor in the second embodiment. Of course, the liquid level may be detected with an even higher resolution using three or more level sensors.

Further, although the circulation/replenishment switching operation is performed only for the white ink in the first embodiment, the circulation/replenishment switching operation may be performed also for the color inks. Further, an operation similar to the circulation operation performed between the head unit 321, 331 and the buffer tank 52 may be performed instead of the circulation/replenishment switching operation (modification).

Further, although the valves 63, 65 are arranged in the head unit 321, 331 in the above embodiments, at least one of the valves 63, 65 may be arranged in the arrangement region R52 for the buffer tank 52. However, the pipes 59, 64 need to be laid between the head unit 321, 331 and the arrangement region R52 and pipe lengths may reach several meters. Accordingly, the arrangement positions of the first embodiment are desirable in view of responsiveness.

The invention is applicable to ink replenishment techniques in general in a printing apparatus and a printing method for printing by discharging an ink from a nozzle of a discharge head toward a recording surface of a printing medium.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

What is claimed is:

1. A printing apparatus, comprising:

a white drum tank configured to store a white ink;

a white buffer tank configured to store the white ink replenished from the white drum tank;

a white head unit configured to print a white image by discharging the white ink supplied from the white buffer tank to a recording surface of a printing medium; and a white ink circulator configured to circulate the white ink between the white drum tank and the white buffer tank in a non-replenishment time during which the white ink is not replenished;

a white replenishment pipe having a first end disposed at the white drum tank and a second end disposed at the white buffer tank to allow the white ink to flow from the white drum tank to the white buffer tank;

a white feeding pump disposed in the white replenishment pipe for feeding the white ink stored in the white drum tank to the white buffer tank through the white replenishment pipe; and a circulation/replenishment switcher, wherein the white ink circulator includes a branch pipe that branches off a branching point on the white replenishment pipe and extends to the white drum tank, the branching point being located between the white feeding pump and the second end of the white replenishment pipe, and wherein the circulation/replenishment switcher includes a first valve disposed between the branching point and the second end and is configured to open and close the first valve to switch between an ink circulation operation of returning the white ink fed from the white feeding pump to the white drum tank through the branch pipe and an ink replenishment operation of feeding the white ink fed from the white feeding pump to the white buffer tank through the white replenishment pipe.

2. A printing method, comprising:

replenishing a white ink from a white drum tank to a white buffer tank by a white feeding pump disposed in a white replenishment pipe, the white feeding pump feeding the white ink stored in the white drum tank to the white buffer tank through the white replenishment pipe, the white replenishment pipe having a first end disposed at the white drum tank and a second end disposed at the white buffer tank;

printing a white image by discharging the white ink supplied from the white buffer tank to a white head unit onto a recording surface of a printing medium by the white head unit; and circulating the white ink between the white drum tank and the white buffer tank in a non-replenishment time during which the white ink is not replenished, by the white feeding pump through a branch pipe that branches off a branching point on the white replenishment pipe and extends to the white drum tank, the branching point being located between the white feeding pump and the second end of the white replenishment pipe; and switching between an ink circulation operation of returning the white ink fed from the white feeding pump to the white drum tank and an ink replenishment operation of feeding the white ink from the white drum tank to the white buffer tank, by opening and closing a first valve disposed between the branching point and the second end.

* * * * *